(12) United States Patent
Zheng et al.

(10) Patent No.: US 11,650,355 B2
(45) Date of Patent: May 16, 2023

(54) PLANAR LENS AND MANUFACTURING METHOD FOR PLANAR LENS

(71) Applicant: SHENZHEN INSTITUTES OF ADVANCED TECHNOLOGY, Shenzhen (CN)

(72) Inventors: Hairong Zheng, Shenzhen (CN); Xiangxiang Xia, Shenzhen (CN); Feiyan Cai, Shenzhen (CN); Manzhu Ke, Shenzhen (CN); Hui Zhou, Shenzhen (CN); Fei Li, Shenzhen (CN); Di Xu, Shenzhen (CN); Yongchuan Li, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 0 days.

(21) Appl. No.: 16/902,225

(22) Filed: Jun. 15, 2020

(65) Prior Publication Data

US 2020/0310002 A1    Oct. 1, 2020

Related U.S. Application Data

(63) Continuation of application No. PCT/CN2017/120165, filed on Dec. 29, 2017.

(30) Foreign Application Priority Data

Dec. 22, 2017  (CN) .......................... 201711409075.5

(51) Int. Cl.
  *G02B 3/00* (2006.01)
  *G10K 11/30* (2006.01)
(52) U.S. Cl.
  CPC ......... *G02B 3/0012* (2013.01); *G02B 3/0037* (2013.01); *G10K 11/30* (2013.01)

(58) Field of Classification Search
  CPC ...... G02B 3/08; G02B 3/0012; G02B 3/0037; G10K 11/30; A61B 8/4488; A61B 8/4281
  See application file for complete search history.

(56) References Cited

U.S. PATENT DOCUMENTS 3,903,990 A * 9/1975 Tannaka ................. G10K 11/30
                                                          181/176
4,562,900 A * 1/1986 Anderson .............. G10K 11/30
                                                          181/176

(Continued)

FOREIGN PATENT DOCUMENTS

CN          2672998         9/2003
CN          1522670 A       8/2004

(Continued)

OTHER PUBLICATIONS

International Search Report issued in corresponding international application No. PCT/CN2017/120165, dated Sep. 13, 2018(9 pages).

(Continued)

*Primary Examiner* — Alicia M Harrington

(57) ABSTRACT

A planar lens (100) and a manufacturing method for a planar lens (100) relate to the technical field of lenses, the planar lens (100) being a focusing lens and comprising an acoustic soft material tangible structure (110) and a cover layer (120), the acoustic soft material tangible structure (110) comprises a plurality of combination lenses (130) located in the same plane, each combination lens (130) comprises a circular part (131) and a plurality of concentric annular parts (132) which are continuously arranged around the circular part (131), the thicknesses of each two adjacent annular parts (132) in each combination lens (130) are different, and the thickness of each annular part (132) is related to the focal length of the respective combination lens (130); and the cover layer (120)

(Continued)

covers the outer surface of the acoustic soft material tangible structure (110) to form the planar lens (100).

18 Claims, 5 Drawing Sheets

(56) References Cited

U.S. PATENT DOCUMENTS

| | | | |
|---|---|---|---|
| 5,402,792 A | | 4/1995 | Kimura |
| 2002/0030423 A1 | | 3/2002 | Fjield et al. |
| 2003/0060736 A1 | * | 3/2003 | Martin .................. A61B 8/4272 601/2 |
| 2009/0254289 A1 | * | 10/2009 | Vivek .................. B06B 1/0622 702/54 |
| 2012/0029393 A1 | * | 2/2012 | Lee ...................... A61B 8/4444 601/2 |
| 2012/0071763 A1 | | 3/2012 | Miller |
| 2016/0125870 A1 | * | 5/2016 | Calvo .................... G10K 11/30 367/138 |
| 2016/0317842 A1 | | 11/2016 | Sliwa et al. |

FOREIGN PATENT DOCUMENTS

| | | | | |
|---|---|---|---|---|
| CN | 201969218 U | | 9/2011 | |
| CN | 105251140 | | 1/2016 | |
| EP | 609404 A1 | * | 8/1994 | ............. B05B 17/06 |

OTHER PUBLICATIONS

First Office Action from China patent office in a counterpart Chinese patent Application 201711409075.5, dated Jan. 25, 2019 (5 pages).
Decision to grant patent from China patent office in a counterpart Chinese patent Application 201711409075.5, dated Jul. 2, 2019 (1 page).
Written Opinion of the International Searching Authority for No. PCT/CN2017/120165.

* cited by examiner

US 11,650,355 B2

PLANAR LENS AND MANUFACTURING METHOD FOR PLANAR LENS

CROSS-REFERENCE TO RELATED APPLICATIONS

The present application is a continuation-application of International (PCT) Patent Application No. PCT/CN2017/120165, filed on Dec. 29, 2017, which claims foreign priorities of Chinese Patent Application No. 201711409075.5, filed on Dec. 22, 2017, the entire contents of which are hereby incorporated by reference.

TECHNICAL FIELD

The present invention relates to the field of lens technologies, and in particular, to a planar lens and a manufacturing method for a planar lens.

BACKGROUND

In recent years, acoustic focusing has been attracting much attention because focused acoustic fields have been widely applied to many sectors, such as ultrasound imaging, ultrasound therapy, and ultrasound surgery in the medical sector. Ultrasound therapy of tumor and brain diseases has gradually become a hot research topic in modern medicine in the past few years. A high-intensity focused ultrasound (HIFU) transducer is adopted in conventional ultrasound therapy. In the HIFU therapy, HIFU is used to cause transient high heat so that tumor tissue can be quickly necrotized, achieving an effect of treating tumors. In neuromodulation research, focused acoustic fields can accurately stimulate nervous nuclei and effectively regulate neural circuits, providing important means for studying pathogenesis and therapy of brain functional diseases such as Parkinson's disease and depression. Therefore, focused acoustic fields have great significance in research of ultrasound therapy.

There are generally two types of focused ultrasound transducers: a self-focused ultrasound transducer with a piezoelectric wafer and a focused ultrasound transducer with an acoustic lens. Currently, global laboratories studying ultrasound therapy basically use commercial concave spherical focused ultrasound transducers for related experimental research. Each focused transducer basically has one fixed focal length and focal spot, and can act on only one region during research performed based on focused acoustic fields. To meet needs of different research, each laboratory needs to buy different models of commercial focused transducers and economic costs are high.

SUMMARY

In view of this, an objective of the present invention is to provide a planar lens and a manufacturing method for a planar lens. A plurality of combination lenses in a same plane may cause multipoint focusing in different regions. There can be different depths of focus based on different focal lengths of the plurality of combination lenses. A problem that one lens can focus on only one region is resolved. In addition, when the planar lens is applied to a technology such as ultrasound therapy or ultrasound imaging, accurate ultrasound stimulation and simultaneous stimulation in different positions can be carried out, featuring advantages of simple operations, low costs, and flexible use.

According to a first aspect, an embodiment of the present invention provides a planar lens. The planar lens is a focusing lens and includes an acoustic soft material tangible structure and a cover layer. The acoustic soft material tangible structure includes a plurality of combination lenses located in a same plane. Each combination lens includes a circular part and a plurality of concentric annular parts that are continuously arranged around the circular part. Thicknesses of adjacent annular parts in each combination lens are different, and a thickness of each annular part is related to a focal length of the respective combination lens. The cover layer covers an outer surface of the acoustic soft material tangible structure to form the planar lens.

With reference to the first aspect, an embodiment of the present invention provides a first possible implementation of the first aspect, where a transmittance of a material used by the cover layer is higher than that of a material used by the acoustic soft material tangible structure.

With reference to the first aspect, an embodiment of the present invention provides a second possible implementation of the first aspect, where the material used by the acoustic soft material tangible structure is epoxy resin, and the material used by the cover layer is silicone gel.

With reference to the first aspect, an embodiment of the present invention provides a third possible implementation of the first aspect, where a total thickness of the planar lens is 3 mm.

With reference to the first aspect, an embodiment of the present invention provides a fourth possible implementation of the first aspect, where each combination lens has a different focal length.

With reference to the first aspect, an embodiment of the present invention provides a fifth possible implementation of the first aspect, where in each combination lens, the circular part corresponds to a same focal length with the plurality of concentric annular parts that are continuously arranged around the circular part.

With reference to the first aspect, an embodiment of the present invention provides a sixth possible implementation of the first aspect, where the material used by the acoustic soft material tangible structure is polymethyl methacrylate or polylactic acid.

With reference to the first aspect, an embodiment of the present invention provides a seventh possible implementation of the first aspect, where the planar lens is used in water.

According to a second aspect, an embodiment of the present invention further provides a manufacturing method for a planar lens, including: calculating a phase required for acoustic focusing in a position along a direction parallel to a planar lens plane based on a propagation wavelength of sound in a medium and a focal length for acoustic focusing; calculating a thickness of an acoustic soft material tangible structure in the position along the direction parallel to the planar lens plane based on the phase required for acoustic focusing; and covering, by a cover layer, an outer surface of the acoustic soft material tangible structure to form the planar lens.

With reference to the second aspect, an embodiment of the present invention provides a first possible implementation of the second aspect, where the thickness of the acoustic soft material tangible structure is calculated based on formula (1) and formula (2):

$$\phi(t)=2\pi/\lambda[h-c_{0L}(t/c_{1L}-(h-t)/c_{2L})] \quad (1); \text{ and}$$

$$\phi(r)=2\pi/\lambda[(F^2+r^2)^{1/2}-F] \quad (2); \text{ where}$$

λ is the wavelength of sound in the medium, $\lambda=2\pi f/c_{0L}$, f is an operating frequency, h is a total thickness of the planar lens, t is the thickness of the acoustic soft material tangible structure, $c_{0L}$ is a propagation velocity of sound in the medium, $c_{1L}$ is a propagation velocity of sound in the acoustic soft material tangible structure, $c_{2L}$ is a propagation velocity of sound at the cover layer, F is the focal length for acoustic focusing, and r is a position of a planar lens center along a direction parallel to an acoustic lens.

The embodiments of the present invention bring the following beneficial effects: When the planar lens is used jointly with an ultrasound transducer, the problem that one lens can focus on only one region is resolved. In addition, when the planar lens is applied to a technology such as ultrasound therapy or ultrasound imaging, a quantity of combination lenses included in the planar lens and focal lengths of the combination lenses can be adjusted, and accurate ultrasound stimulation and simultaneous stimulation in different positions can be carried out. The present invention features advantages of simple operations, low costs, and flexible use.

Additional features and advantages of the present invention will be set forth in the subsequent specification, and in part will become clear from the specification, or be learned by practice of the present invention. Objectives and additional advantages of the present invention are implemented and obtained by using structures specially specified in the specification, claims, and accompanying drawings.

To make the foregoing objectives, features, and advantages of the present invention clearer and more comprehensible, the following specifically describes preferred embodiments in detail with reference to the accompanying drawings.

BRIEF DESCRIPTION OF DRAWINGS

To describe the specific implementations of the present invention or the technical solutions in the prior art more clearly, the following briefly describes the accompanying drawings required for describing the specific implementations or the prior art. Clearly, the accompanying drawings in the following description show some implementations of the present invention, and persons of ordinary skill in the art may still derive other drawings from these accompanying drawings without creative efforts.

REFERENCE NUMERALS

100: planar lens; 110: acoustic soft material tangible structure; 120: cover layer; 130: combination lens; 131: circular part; 132: annular part; and 200: planar ultrasound transducer.

DESCRIPTION OF EMBODIMENTS

To make the objectives, technical solutions, and advantages of the embodiments of the present invention clearer, the following clearly and comprehensively describes the technical solutions of the present invention with reference to the accompanying drawings. Clearly, the described embodiments are some but not all of the embodiments of the present invention. All other embodiments obtained by persons of ordinary skill in the art based on the embodiments of the present invention without creative efforts shall fall within the protection scope of the present invention.

Currently, global laboratories studying ultrasound therapy basically use commercial concave spherical focused ultrasound transducers for related experimental research. Each focused transducer basically has one fixed focal length and focal spot, and can act on only one region during research performed based on focused acoustic fields. To meet needs of different research, each laboratory needs to buy different models of commercial focused transducers and economic costs are high. Based on this, the embodiments of the present invention provide a planar lens and a manufacturing method for a planar lens. A plurality of combination lenses are included in a same plane, and the plurality of combination lenses may focus on different regions. In addition, there can be different depths of focus based on different focal lengths of the plurality of combination lenses. Therefore, when the planar lens is used jointly with an ultrasound transducer, a problem that one lens can focus on only one region is resolved. In addition, when the planar lens is applied to a technology such as ultrasound therapy or ultrasound imaging, a quantity of combination lenses included in the planar lens and focal lengths of the combination lenses can be adjusted, and accurate ultrasound stimulation and simultaneous stimulation in different positions can be carried out. The present invention features advantages of simple operations, low costs, and flexible use.

Figure 1:
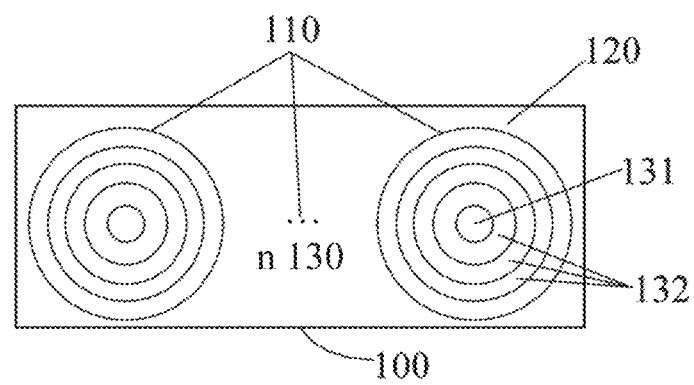
FIG. 1 is a schematic diagram of a planar lens according to an embodiment of the present invention.

For ease of understanding of the embodiments, a planar lens disclosed in the embodiments of the present invention is first described in detail. As shown in FIG. 1, a planar lens 100 is a focusing lens, including an acoustic soft material tangible structure 110 and a cover layer 120.

Figure 2:
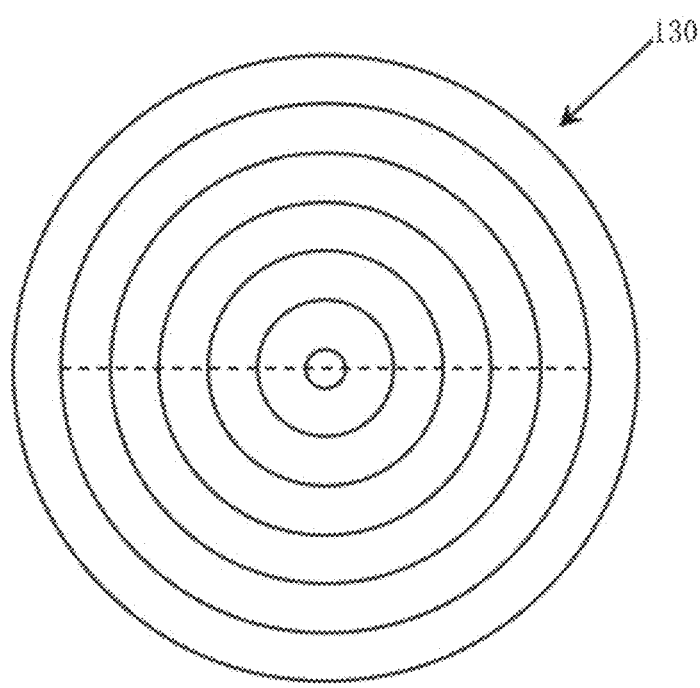
FIG. 2 is a schematic plan view of a combination lens according to an embodiment of the present invention.
Figure 3:
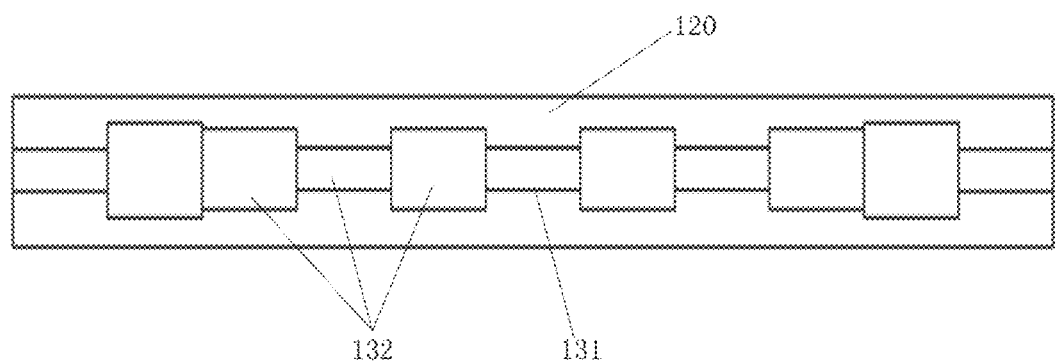
FIG. 3 is a schematic cross-sectional view of a combination lens according to an embodiment of the present invention.

With reference to FIG. 2 and FIG. 3, the acoustic soft material tangible structure 110 includes a plurality of combination lenses 130 located in a same plane, each combination lens 130 includes a circular part 131 and a plurality of concentric annular parts 132 that are continuously arranged around the circular part 131, thicknesses of adjacent annular parts 132 in each combination lens are different, and a thickness of each annular part 132 is related to a focal length of the respective combination lens. The cover layer 120 covers an outer surface of the acoustic soft material tangible structure 110 to form the planar lens 100.

Figure 4:
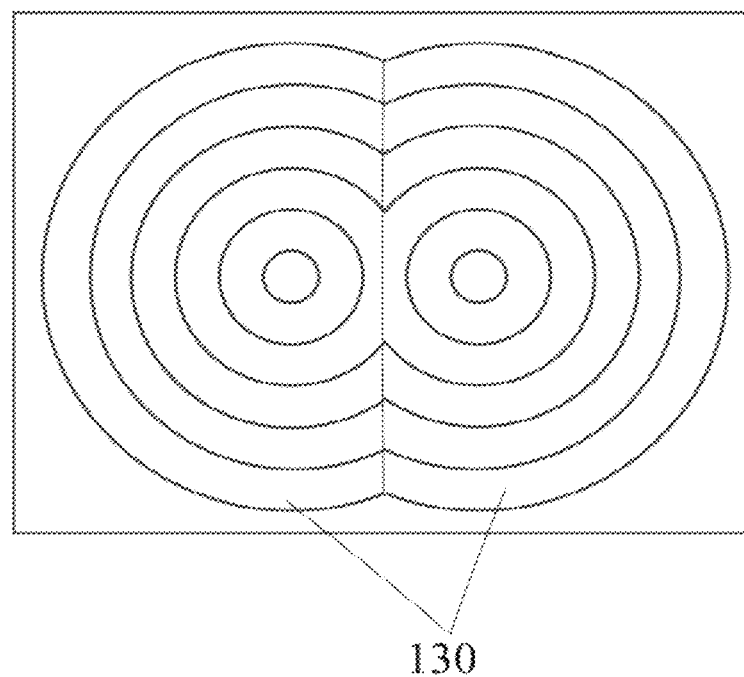
FIG. 4 is a schematic diagram of a planar lens with two combination lenses according to an embodiment of the present invention.
Figure 5:
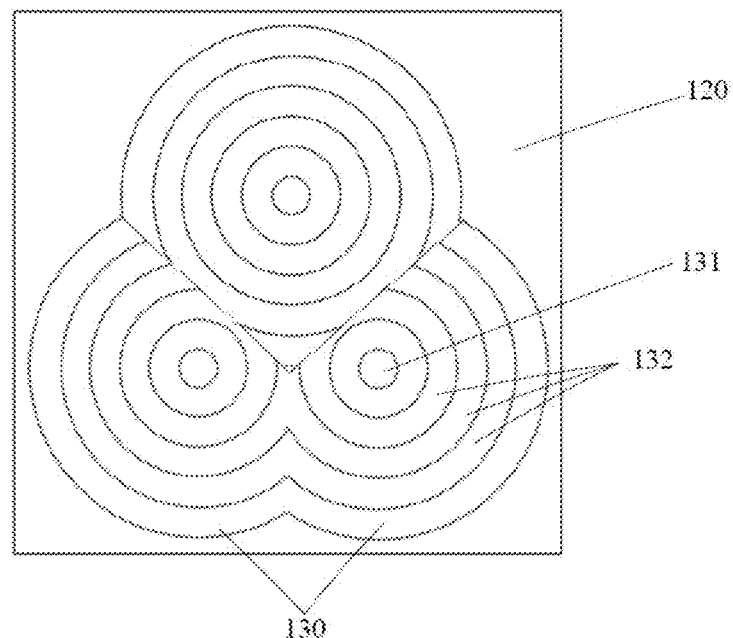
FIG. 5 is a schematic diagram of a planar lens with three combination lenses according to an embodiment of the present invention.

It should be noted that, the plurality of combination lenses 130 are closely connected in the same plane, or the plurality of combination lenses 130 are laid flat in the same plane and are disconnected. In an example in which the plurality of combination lenses 130 are closely connected in the same plane, as shown in FIG. 4, a part is cut from each of two combination lenses 130 illustrated, and the two combination lenses 130 are closely connected. As shown in FIG. 5, a part is cut from each of three combination lenses 130 illustrated, and the three combination lenses 130 are closely connected.

In some embodiments, a transmittance of a material used by the cover layer 120 is higher than that of a material used by the acoustic soft material tangible structure 110.

In an example in which the planar lens 100 is used in water jointly with a planar ultrasound transducer 200, the acoustic soft material tangible structure 110 mainly focuses ultrasound waves. If the acoustic soft material tangible structure 110 has a high reflectivity in water, to be specific, ultrasound waves transmittable by the planar lens 100 prepared by using the acoustic soft material tangible structure 110 have very little energy, transmitted and focused sound waves have poor quality. Therefore, the material used by the cover layer 120 needs to have a higher transmittance in water than the material used by the acoustic soft material tangible structure 110. In this way, energy of ultrasound waves transmitted by the planar lens 100 is greater than energy of ultrasound waves reflected by the planar lens 100, and transmitted and focused sound waves of higher quality can be obtained.

In some embodiments, the material used by the acoustic soft material tangible structure 110 is epoxy resin, and the material used by the cover layer 120 is silicone gel.

Specifically, epoxy resin and solidified silicone gel each have a high transmittance in water, but silicone gel is easy to deform while epoxy resin is not. Therefore, when the material used by the acoustic soft material tangible structure 110 is epoxy resin, and the material used by the cover layer 120 is silicone gel, the planar lens 100 with such a combination not only can form a tangible state in water, but also can enable stable and high-quality transmitted ultrasound waves. A preparation process is as follows: A plurality of combination lenses made from epoxy resin are first prepared. Then, silicone gel is injected into grooves of the plurality of combination lenses made from epoxy resin. Afterwards, a mould with a smooth surface is used for flattening, and the planar lens 100 is formed after the silicone gel is solidified.

In some embodiments, a total thickness of the planar lens is 3 mm.

For example, the planar lens provided by the present invention is calculated by using formula (1) and formula (2):

$$\varphi(t) = 2\pi/\lambda [h - c_{0L}(t/c_{1L} - (h-t)/c_{2L})] \quad (1); \text{ and}$$

$$\varphi(r) = 2\pi/\lambda [(F^2 + r^2)^{1/2} - F] \quad (2); \text{ where}$$

$\lambda$ is the wavelength of sound in the medium, $\lambda = 2\pi f/c_{0L}$, f is an operating frequency, h is a total thickness of the planar lens, t is the thickness of the acoustic soft material tangible structure, $c_{0L}$ is a propagation velocity of sound in the medium, $c_{1L}$ is a propagation velocity of sound in the acoustic soft material tangible structure, $c_{2L}$ is a propagation velocity of sound at the cover layer, F is the focal length for acoustic focusing, r is a position of a planar lens center along a direction parallel to an acoustic lens, and a value of r may range from 0 to infinity.

Specifically, a phase varying with the thickness of the acoustic soft material tangible structure 110 is calculated by using formula (1), and a phase along the direction parallel to the acoustic lens plane is calculated by using formula (2). When the focal length F required by the planar lens 100 is determined, the value of the position r ranges from 0 to half of the total thickness, that is, a value range of the position r is [0, 21] in the unit of millimeter, and a width of each annular part is a value of the position r and increases with the value of the position r. A phase in this position is calculated by using formula (2), and then is substituted into formula (1). Based on the 3 mm total thickness of the planar lens, a thickness t in the position r is obtained, that is, a thickness of the annular part is obtained. Subsequently, the cover layer is applied to the outer surface of the acoustic soft material tangible structure to form the planar lens 100. A width of each annular part can be 3 mm.

In some embodiments, each combination lens has a different focal length. Further, in each combination lens, the circular part corresponds to a same focal length with the plurality of concentric annular parts that are continuously arranged around the circular part.

Specifically, the plurality of combination lenses 130 included in the planar lens 100 have their respective focal lengths, which may be the same or different. The circular part 131 and the annular part 132 in each combination lens 130 have a same focal length, that is, one combination lens 130 includes several lens, and the several lens may have the same focal length or different focal lengths.

Figure 6:
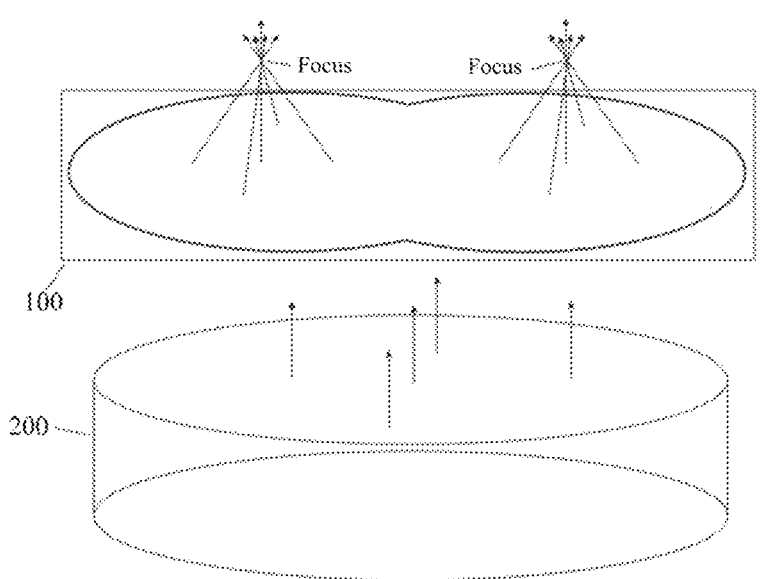
FIG. 6 is a schematic diagram of a focusing principle of a planar lens with two combination lenses according to one embodiment of the present invention.

As shown in FIG. 6, the planar ultrasound transducer 200 emits ultrasound waves, which are focused by the planar lens 100. The planar lens 100 has two combination lenses 130. Focal lengths of annular parts 132 of the two combination lenses 130 are the same. It can be seen from the figure that, when the two combination lenses have the same focal length, the combination lenses each have one focus respectively in two regions, and the two focuses are located in a same horizontal plane.

Figure 7:
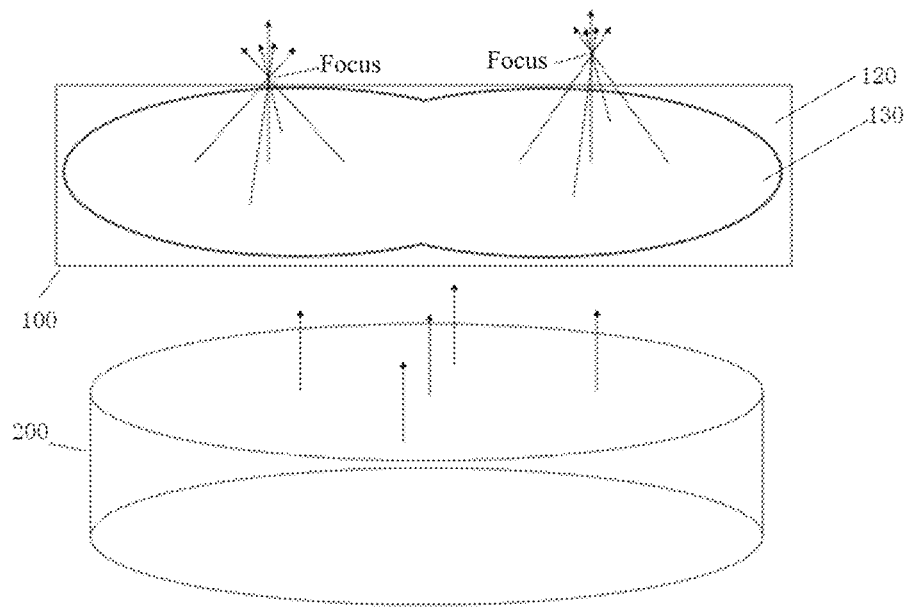
FIG. 7 is a schematic diagram of a focusing principle of a planar lens with two combination lenses according to another embodiment of the present invention.

As shown in FIG. 7, the planar ultrasound transducer 200 emits ultrasound waves, which are focused by the planar lens 100. The planar lens 100 has two combination lenses 130. Focal lengths of annular parts 132 of the two combination lenses 130 are the same. It can be seen from the figure that, when the two combination lenses have different focal lengths, the combination lenses each have one focus respectively in two regions, and the two focuses are located in different horizontal planes based on the different focal lengths.

Figure 8:
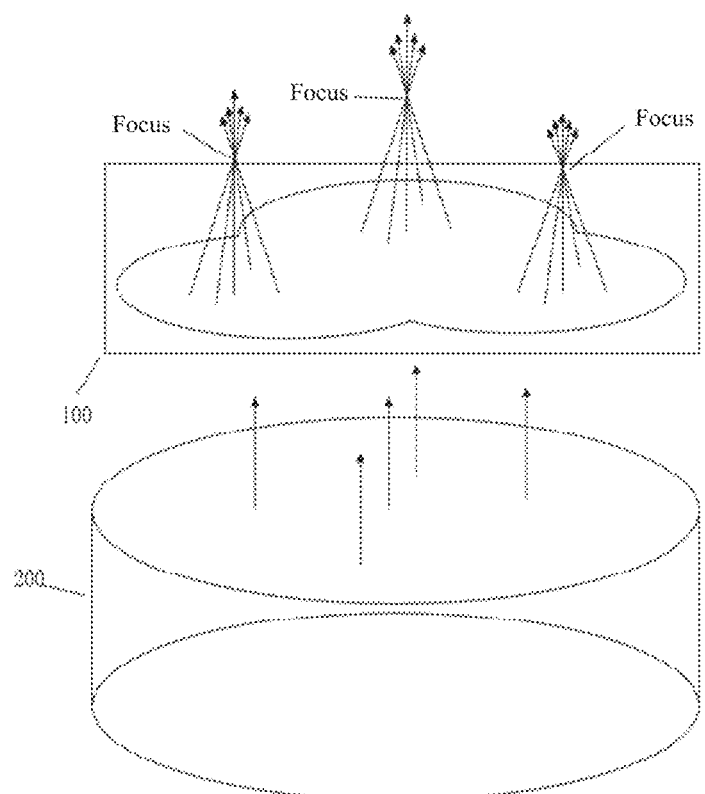
FIG. 8 is a schematic diagram of a focusing principle of a planar lens with three combination lenses according to one embodiment of the present invention.

As shown in FIG. 8, the planar lens 100 has three combination lenses 130, and the planar ultrasound transducer 200 emits ultrasound waves, which are focused by the planar lens 100. It can be seen from the figure that, when the three combination lenses 130 have a same focal length, the combination lenses each have one focus respectively in three regions, and the three focuses are located in a same horizontal plane.

Figure 9:
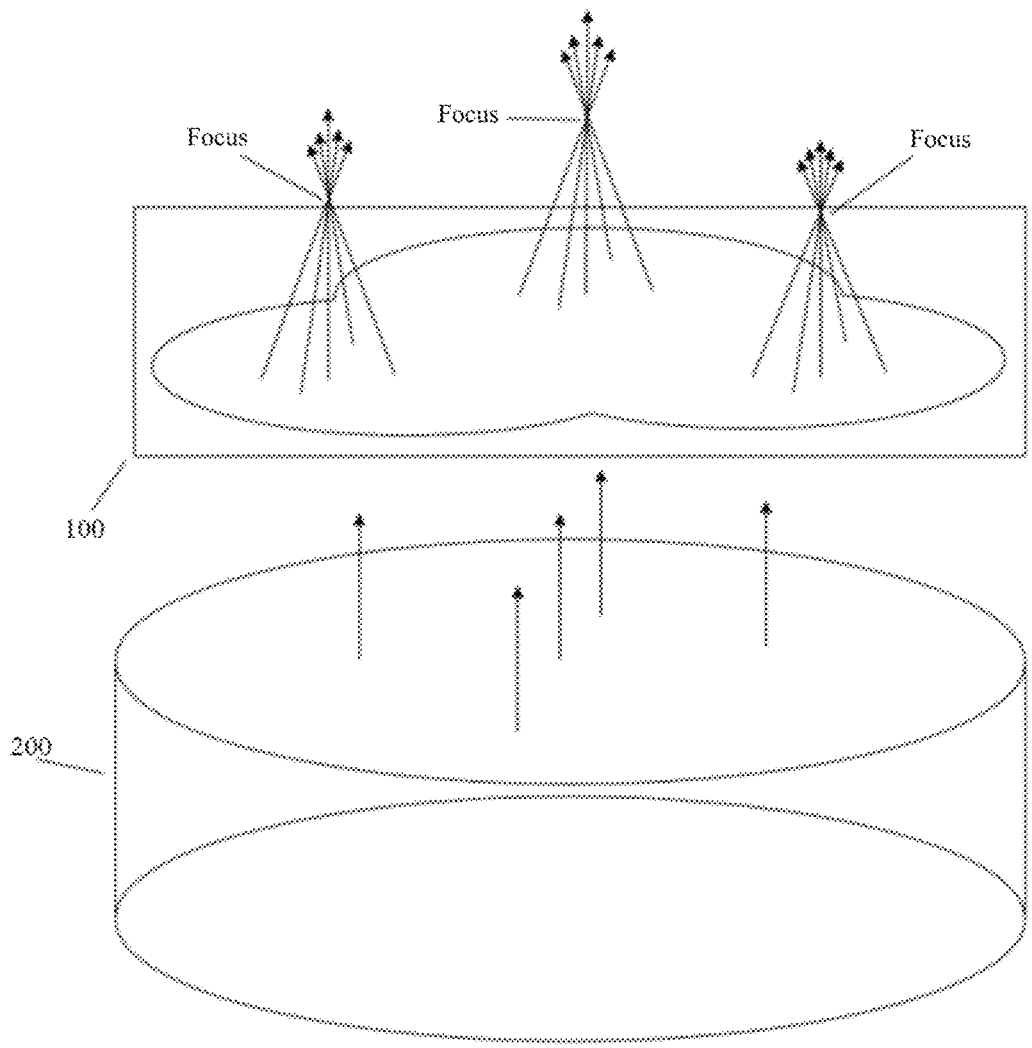
FIG. 9 is a schematic diagram of a focusing principle of a planar lens with three combination lenses according to another embodiment of the present invention.

As shown in FIG. 9, the planar lens 100 has three combination lenses 130, and the planar ultrasound transducer 200 emits ultrasound waves, which are focused by the planar lens 100. It can be seen from the figure that, when the three combination lenses 130 have different focal lengths, the combination lenses each have one focus respectively in three regions, and the three focuses are located in different horizontal planes.

In conclusion, it can be learned that the planar lens 100 of the present invention may have a plurality of combination lenses, and the plurality of combination lenses may have a same focal length, or some of the plurality of combination lenses may have a same focal length, or the plurality of combination lenses may have different focal lengths. In addition, a quantity of combination lenses is equal to a quantity of obtained ultrasound wave propagation regions and a quantity of obtained focuses. Therefore, the planar lens 100 of the present invention can accurately and flexibly adjust a depth of focus for planar ultrasound wave focusing.

It should be noted that the focal length may also be referred to as depth of focus.

In some embodiments, the material used by the acoustic soft material tangible structure 110 is polymethyl methacrylate or polylactic acid. The two materials polymethyl methacrylate and polylactic acid each have a relatively high transmittance in water. The acoustic soft material tangible structure 110 may alternatively be other materials with approximate acoustic parameters.

Figure 10:
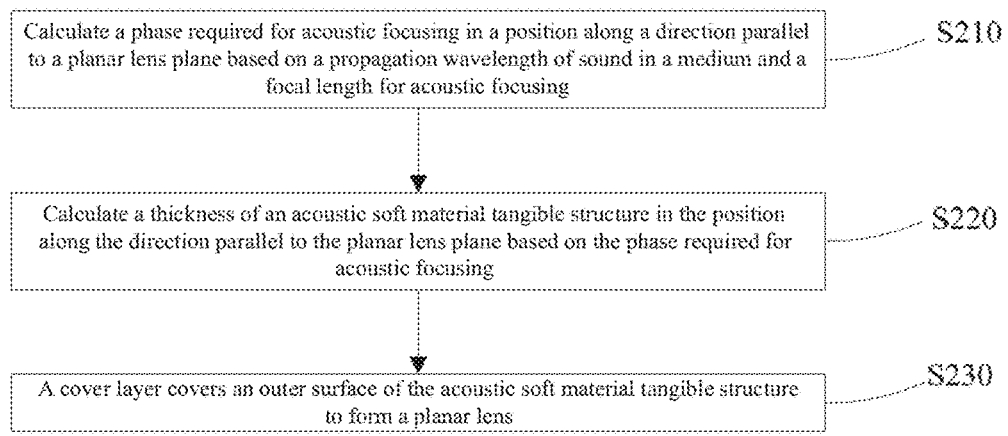
FIG. 10 is a flowchart of a manufacturing method for a planar lens according to an embodiment of the present invention.

Referring to FIG. 10, a manufacturing method for a planar lens includes the following steps:

S210: Calculate a phase required for acoustic focusing in a position along a direction parallel to a planar lens plane based on a propagation wavelength of sound in a medium and a focal length for acoustic focusing.

S220: Calculate a thickness of an acoustic soft material tangible structure in the position along the direction parallel to the planar lens plane based on the phase required for acoustic focusing.

S230: A cover layer covers an outer surface of the acoustic soft material tangible structure to form the planar lens.

As an example, the thickness of the acoustic soft material tangible structure is calculated based on formula (1) and formula (2):

$$\varphi(t) = 2\pi/\lambda [h - c_{0L}(t/c_{1L} - (h-t)/c_{2L})] \quad (1); \text{ and}$$

$$\varphi(r) = 2\pi/\lambda [(F^2 + r^2)^{1/2} - F] \quad (2); \text{ where}$$

$\lambda$ is the wavelength of sound in the medium, $= 2\pi f/c_{0L}$, f is an operating frequency, h is a total thickness of the planar lens, t is the thickness of the acoustic soft material tangible structure, $c_{0L}$ is a propagation velocity of sound in the medium, $c_{1L}$ is a propagation velocity of sound in the acoustic soft material tangible structure, $c_{2L}$ is a propagation velocity of sound at the cover layer, F is the focal length for acoustic focusing, and r is a position of a planar lens center along a direction parallel to an acoustic lens.

Unless otherwise specified, the relative steps, numerical expressions, and values of the components and steps described in these embodiments do not limit the scope of the present invention.

In all the examples shown and described herein, any specific value should be interpreted as merely an example instead of a limitation. Therefore, other examples in example embodiments may have different values.

It should be noted that similar reference numerals and letters denote similar items in the following accompanying drawings. Therefore, once a particular item is defined in one accompanying drawing, no further definition or interpretation is required in the subsequent accompanying drawings.

The flowchart in the accompanying drawing shows the possible system architectures, functions, and operations of the systems, methods, and computer program products in multiple embodiments according to the present invention. In this regard, each block in the flowchart may represent one module, program segment, or part of code that contains one or more executable instructions used for implementing a specified logical function. It should be also noted that in some alternative implementations, the functions denoted in the blocks may alternatively be performed in an order other than that denoted in the accompanying drawing. For example, two consecutive blocks can actually be executed substantially in parallel, and they can sometimes be executed in an opposite order, depending on the functions involved. It should also be noted that each block in the flowchart and a combination of blocks in the flowchart may be implemented by a dedicated hardware-based system that performs specified functions or actions, or implemented by a combination of dedicated hardware and computer instructions.

In addition, in the description of the embodiments of the present invention, the term "connection" should be understood in a broad sense unless otherwise stipulated and limited. For example, "connection" may be a fixed connection, a detachable connection, or an integrated connection; may be a mechanical connection or an electrical connection; and may be a direct connection, a connection through an intermediate medium, or a connection inside two elements. For persons of ordinary skill in the art, a specific meaning of the foregoing term in the present invention may be understood according to a specific situation.

In the description of the present invention, it should be noted that directions or position relationships indicated by terms "center", "up", "down", "horizontal", "interior", "exterior", and the like are based on directions or position relationships shown by the accompanying drawings, which are used only for describing the present invention and for description simplicity, but do not indicate or imply that an indicated apparatus or element must have a specific orientation or must be constructed and operated in a specific orientation. Therefore, this cannot be understood as a limitation on the present invention. In addition, the terms "first", "second", and "third" are used only for descriptive purposes and cannot be construed as indicating or implying relative importance.

Finally, it should be noted that the foregoing embodiments are merely specific implementations of the present invention, and are intended for describing the technical solutions of the present invention, but not limiting the present invention. The protection scope of the present invention is not limited thereto. Although the present invention is described in detail with reference to the foregoing embodiments, persons of ordinary skill in the art should understand that they may still make modifications or readily figured out variations to the technical solutions described in the foregoing embodiments or make equivalent replacements to some technical features thereof, without departing from the spirit and scope of the technical solutions of the embodiments of the present invention. Therefore, the protection scope of the present invention shall be subject to the protection scope of the claims.

What is claimed is:

1. A planar lens, the planar lens being a focusing lens and comprising an acoustic soft material tangible structure and a cover layer, wherein the acoustic soft material tangible structure comprises a plurality of combination lenses located in a same plane, each combination lens comprises a circular part and a plurality of concentric annular parts that are continuously arranged around the circular part, thicknesses of adjacent annular parts in each combination lens are different, and a thickness of each annular part is related to a focal length of the respective combination lens; and the cover layer covers an outer surface of the acoustic soft material tangible structure to form the planar lens;

wherein both front and back sides of the acoustic soft material tangible structure are covered in the cover layer, and both front and back outer surfaces of the cover layer are flat and run parallel to each other;

wherein each of the plurality of combination lenses has a distinct different focal length;

wherein the material used by the acoustic soft material tangible structure is epoxy resin, and the material used by the cover layer is silicone.

2. The planar lens according to claim 1, wherein a transmittance of a material used by the cover layer is higher than that of a material used by the acoustic soft material tangible structure.

3. The planar lens according to claim 2, wherein the material used by the acoustic soft material tangible structure is polymethyl methacrylate or polylactic acid.

4. The planar lens according to claim 3, wherein the planar lens is used in water.

5. The planar lens according to claim 2, wherein the planar lens is used in water.

6. The planar lens according to claim 1, wherein a total thickness of the planar lens is 3 mm.

7. The planar lens according to claim 6, wherein the planar lens is used in water.

8. The planar lens according to claim 1, wherein in each combination lens, the circular part corresponds to a same focal length with the plurality of concentric annular parts that are continuously arranged around the circular part.

9. The planar lens according to claim 8, wherein the planar lens is used in water.

10. The planar lens according to claim 1, wherein the planar lens is used in water.

11. The planar lens according to claim 1, wherein the planar lens is used in water.

12. The planar lens according to claim 1, wherein both front and back sides of the circular part are flat and run parallel to each other.

13. The planar lens according to claim 1, wherein both front and back sides of each of the annular parts in each combination lens are flat and run parallel to each other.

14. The planar lens according to claim 1, wherein each annular part has a width of 3 mm.

15. The planar lens according to claim 1, wherein a portion is cut from each of the plurality of combination lenses, and the remaining portions of the plurality of combination lenses are closely fitted and connected.

16. The planar lens according to claim 1, wherein the acoustic soft material tangible structure is as a whole entirely wrapped inside the cover layer.

17. A manufacturing method for a planar lens, comprising:

calculating a phase required for acoustic focusing in a position along a direction parallel to a planar lens plane based on a propagation wavelength of sound in a medium and a focal length for acoustic focusing;

calculating a thickness of an acoustic soft material tangible structure in the position along the direction parallel to the planar lens plane based on the phase required for acoustic focusing; and covering, by a cover layer, an outer surface of the acoustic soft material tangible structure to form the planar lens;

wherein both front and back sides of the acoustic soft material tangible structure are covered in the cover layer, and both front and back outer surfaces of the cover layer are flat and run parallel to each other;

wherein each of the plurality of combination lens has a distinct different focal length;

wherein the material used by the acoustic soft material tangible structure is epoxy resin, and the material used by the cover layer is silicone.

18. The manufacturing method for a planar lens according to claim 17, wherein the thickness of the acoustic soft material tangible structure is calculated based on formula (1) and formula (2):

$$\phi(t)=2\pi/\lambda[h-c_{0L}(t/c_{1L}-(h-t)/c_{2L})] \qquad (1); \text{ and}$$

$$\phi(r)=2\pi/\lambda[(F^2+r^2)^{1/2}-F] \qquad (2); \text{ where}$$

$\lambda$ is the wavelength of sound in the medium, $\lambda=2\pi f/c_{0L}$, f is an operating frequency, h is a total thickness of the planar lens, t is the thickness of the acoustic soft material tangible structure, $c_{0L}$ is a propagation velocity of sound in the medium, $c_{1L}$ is a propagation velocity of sound in the acoustic soft material tangible structure, $c_{2L}$ is a propagation velocity of sound at the cover layer, F is the focal length for acoustic focusing, and r is a position of a planar lens center along a direction parallel to an acoustic lens.

* * * * *